United States Patent [19]

Erdman

[11] 4,437,296
[45] Mar. 20, 1984

[54] DRAPER PICK-UP TINE

[75] Inventor: Victor B. Erdman, Leathbridge, Canada

[73] Assignee: Victory Equipment Limited, Lethbridge, Canada

[21] Appl. No.: 271,938

[22] Filed: Jun. 9, 1981

Related U.S. Application Data

[63] Continuation-in-part of Ser. No. 108,562, Dec. 31, 1979, abandoned.

[51] Int. Cl.³ ............................................ A01D 77/00
[52] U.S. Cl. ...................................................... 56/400
[58] Field of Search ................................. 56/400, 364

[56] References Cited

U.S. PATENT DOCUMENTS

| | | | |
|---|---|---|---|
| 2,364,303 | 12/1944 | Martin | 56/400 |
| 3,099,347 | 7/1963 | Dahlquist | 56/400 |
| 3,344,908 | 10/1967 | Hofer | 56/400 |
| 3,561,206 | 2/1971 | Fuller et al. | 56/400 |
| 3,921,376 | 11/1975 | Hofer | 56/400 |
| 3,935,697 | 2/1976 | Hofer | 56/400 |
| 4,145,866 | 3/1979 | Zweegers | 56/400 |

FOREIGN PATENT DOCUMENTS 1230610 12/1966 Fed. Rep. of Germany ........ 56/400

Primary Examiner—Jay N. Eskovitz
Attorney, Agent, or Firm—Stanley G. Ade

[57] ABSTRACT

The tine includes a base and a tine extending therefrom and is mounted to the belt by a single bolt extending through the belt and base. A rib is formed on the underside of the base which engages the surface of the belt and enables the tine to be positioned at an angle to the plane of the belt and to be held by the rib which prevents it from turning. The tines may be made from plastic, metal or metal covered with plastic or rubber. The flexibility of the belt and the tine reduce the possibility of the tine assembly from picking up rocks and it can be used on such implements as pick-up reels, on combine harvesters, balers, windrow turners, side delivery rakes, and the like.

8 Claims, 10 Drawing Figures

DRAPER PICK-UP TINE

BACKGROUND OF THE INVENTION

This application is a continuation-in-part application of Ser. No. 108,562, filed Dec. 31st, 1979 and now abandoned.

The invention relates to new and useful improvements in tines for pick-up sections of agricultural machinery such as the pick-up reels on combine harvesters, balers, windrow turners or side delivery rakes both wheel-type and bar rakes, or in any other equipment where a draper carries pick-up tines for the engagement with harvested crop or the like.

One of the difficulties with such equipment is to provide a tine assembly which will ensure adequate pick-up of the crop yet at the same time will not pick up stones, rocks or the like, the inclusion of which may well damage the machinery associated with the equipment.

SUMMARY OF THE INVENTION

The present invention satisfies design parameters and one aspect of the invention consists of a pick-up tine assembly for use with drapers, pick-up belts or the like constitutes a flexible supporting surface comprising a supporting surface engaging base portion, a tine extending from said base portion to prevent said tine assembly from inadvertent turning relative to the plane of said supporting surface, when attached thereto, said means including at least one rib extending across said underside of said base and projecting from the plane thereof, said base portion including a dome-shaped supporting surface engaging element, a tine attaching block formed upon the upper side of said element, said tine extending upwardly and outwardly from one end of said block, clamping means detachably securing said assembly to the supporting surface in any radial position relative to the plane of said supporting surface whereby said tine extends and is maintained in any desired radial direction relative to the plane of said supporting surface, said clamping means including a screw threaded bolt, a relatively large head on said bolt having a flat outer surface and a dome inner surface, said bolt extending through said supporting surface, with the domed inner surface engaging one side of said supporting surface, said base portion of the tine assembly being concave, said tine assembly being situated on the other side of said supporting surface, said bolt engaging through said base portion, and screw threaded clamp means engaging the upper end of said bolt and clamping said tine assembly to said supporting surface urging said supporting surface into said concave base whereby the flat outer surface of the bolt head is substantially flush with said one side of said supporting surface.

Another aspect of the invention is to provide a pick-up tine assembly which can be secured to the belt draper portion of the equipment at any desired rotative angle relative to the plane of the belt or draper and which will remain in the desired position when in use.

A still further advantage of the present invention is to provide a tine assembly which is adapted to be secured to the belt or draper by a single bolt and which can therefore be positioned readily and easily in any desired position upon the belt or draper merely by forming a single aperture for each tine through the belt or draper and attaching the tine assembly by the aforementioned single bolt assembly.

A yet further advantage of the present invention is to provide a device which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part thereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
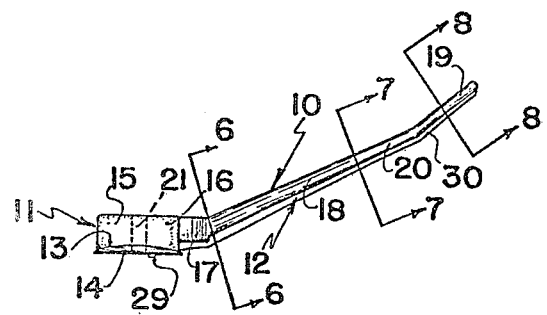
FIG. 1 is a side elevation of the tine assembly per se.

Proceeding therefore to describe the invention in detail, reference should first be made to FIG. 1 in which the tine assembly is illustrated generally by reference character 10. It includes a base collectively designated 11 with a tine collectively designated 12 extending outwardly and upwardly from one side thereof. In detail, the base consists of the lower dome-shaped portion 13 having a planar base 14 and a domed upper surface 15. Extending upwardly therefrom and formed integrally therewith is a tine carrying block 16 with the tine 12 extending from one end thereof and the lower end 17 of the tine being enlarged as it blends in with the end of the block 16, for strength purposes.

The tine 12 includes the first portion 18 extending at an angle upwardly and outwardly from the block 16 as clearly shown with a distal end portion 19 extending upwardly at an angle from the upper end 20 of the first portion 18 extending at an angle upwardly and outwardly from the block 16 as clearly shown with a distal end portion 19 extending upwardly at an angle from the upper end 20 of the first portion 18 and at an angle thereto as clearly illustrated.

An aperture or drilling 21 is formed vertically through the block 16 and centrally through the base 14 and the planar base 14 normally engages the uppersurface 22 of the belt or draper 23 to which the tine assembly are secured.

Figure 5:
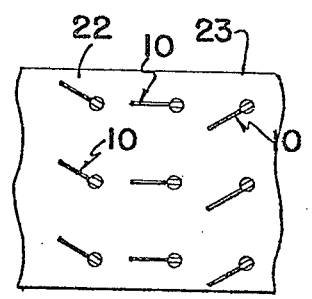
FIG. 5 is a schematic plan view of a portion of a belt or draper showing various locations of tine assemblies thereon.
Figure 2:
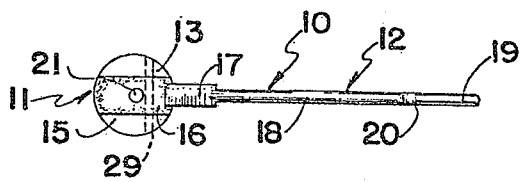
FIG. 2 is a top plan view thereof.

Means are provided to secure the tine assembly to the belt or draper 23 taking the form of a bolt collectively designated 24 having a relatively large head 25 with the stem 26 of the bolt extending through an aperture 27 in the belt or draper and through the aforementioned aperture or drilling 21 in the base 13 and the block 16. A washer 27' together with a screw threaded member such as nut 28 engage the upper end of the stem 26 and, when tightened, clamp the tine assembly to the surface of the belt. When installed, the tine assemblies may be positioned in any desired location as illustrated, by example only, in FIG. 5 merely by forming the aperture 27 through the belt as and where desired.

Also it will be noted that the tine assembly may be rotated relative to the plane of the belt or draper and locked in position as shown.

Means are provided to maintain the original positioning of the tine assemblies and to prevent inadvertent rotation relative to the plane of the belt or draper, said means taking the form of a transverse rib 29 formed upon the planar underside surface 14 of the base and extending transversely thereacross to one side of the aperture drilling 21. It will be appreciated that projections of other configurations may be provided if desired. However, when the tine assembly is clamped into position upon the belt or draper 23, this rib indents into the upper surface 22 thus preventing inadvertent rotary movement of the tine assemblies during use.

Figure 6:
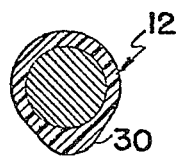
FIG. 6 is a cross sectional view of the tine showing the metal and plastic or rubber cover and illustrating the supporting fin along the line 6—6 of FIG. 1.
Figure 3:
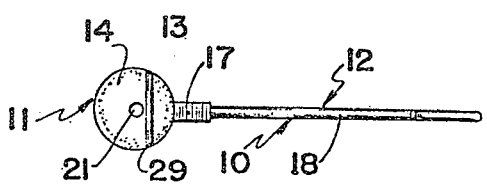
FIG. 3 is an underside plan view thereof.
Figure 7:
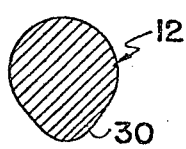
FIG. 7 is a cross sectional view of the tine manufactured from metal and illustrating the supporting fin along the line 7—7 of FIG. 1.
Figure 4:
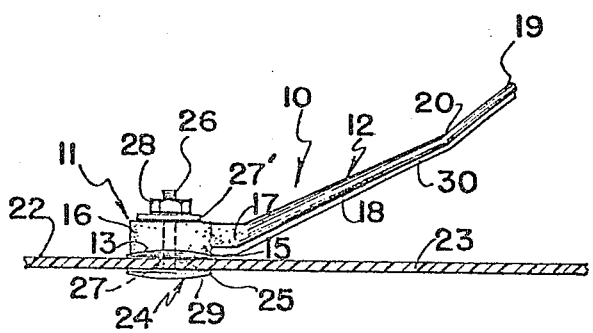
FIG. 4 is a view similar to FIG. 1, but showing the assembly attached to the belt or draper.
Figure 8:
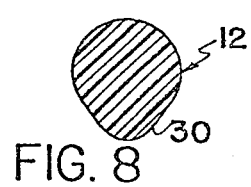
FIG. 8 is a cross sectional view of the tine manufactured from synthetic plastic and illustrating the supporting fin along the line 8—8 of FIG. 1.

FIGS. 6, 7 and 8 show cross sectional configurations of the tine assemblies which can be made of metal as illustrated in FIG. 7, plastic as shown in FIG. 8, or metal covered with rubber or plastic as shown in FIG. 6. Although only the tine portion 12 is shown in FIGS. 6, 7 and 8, nevertheless it will be appreciated that it is desirable that the entire tine assembly be manufactured in one piece and of the same material.

Also shown in the views are cross sectional configurations of a tapered supporting rib 30 formed along the underside of the tine and extending from the base 11 to adjacent the distal end portion 19. This rib supports the tine and particularly assists in preserving the angulation between portions 18 and 19 of the tine.

Figure 9:
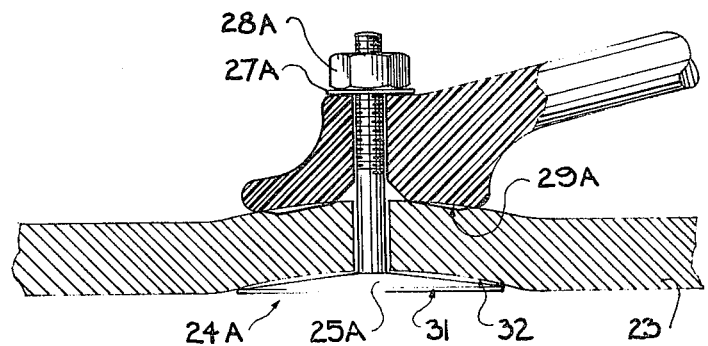
FIG. 9 is an enlarged fragmentary cross sectional view of part of the belt or supporting surface with a tine assembly attached thereto.
Figure 10:
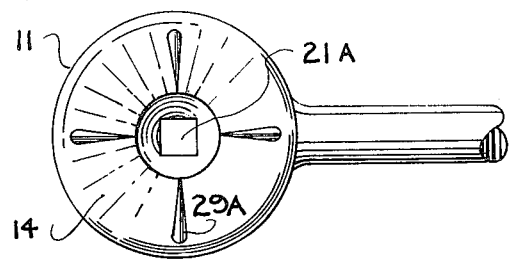

FIGS. 9 and 10 show the preferred embodiment and referring first to FIG. 10, this shows the underside of the base portion 11 which is concave as clearly shown in FIG. 9.

A plurality of edge sharpened ribs 29A project from the underside 14 acting in a manner similar to the aforementioned rib 29.

The aperture 21A in this embodiment is of a square cross section although any other polyeonal cross sectional configuration can be used.

The significance of the concave undersurface 14 is shown in FIG. 9 in which the bolt collectively designated 24A is shown with the relatively large head 25A having a flat or planar outer surface 31 and a domed inner surface 32 having a configuration similar to the concave undersurface 14 of the tine base 11. The bolt is inserted through an aperture in the belt or supporting surface 23 and the tine assembly is engaged over the bolt shank on the opposite side of the belt 23 whereupon the nut 28A is tightened downwardly upon the washer 27A.

It should be understood that the tine is situated in the desired relationship relative to the belt 23 prior to tightening so that when it is tightened, the ribs 29 may bite into the upper surface of the belt 23 as clearly shown. Furthermore, as the nut 28A is tightened, the belt is distorted upwardly so that the upper surface is drawn into the concave undersurface 14 of the tine assembly and the curved or domed inner surface 32 of the bolt pulls the belt upwardly as shown so that the outer flat surface 31 of the bolt head lies flush with the undersurface of the belt thus enabling same to pass around the pulleys or rollers mounting the draper, belt or the like upon which the tines are mounted. If this bolt head is not situated flush with the undersurface of the belt, considerable wear, noise and the like is of course produced as the bolt heads pass over the solid rollers or pulleys.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A pick-up tine assembly for use with drapers, pick-up belts or the like which constitutes a flexible supporting surface; comprising a supporting surface engaging base portion, a tine extending from said base portion and means on the underside of said base portion to prevent said tine assembly from inadvertent turning relative to the plane of said supporting surface, when attached thereto, said means including at least one edge sharpened rib extending across said underside of said base and projecting from the plane thereof, said base portion including a dome-shaped supporting surface engaging element, a tine attaching block formed upon the upper side of said element, said tine extending upwardly and outwardly from one end of said block, clamping means detachably securing said assembly to the supporting surface in any radial position relative to the plane of said supporting surface whereby said tine extends and is maintained in any desired radial direction relative to the plane of said supporting surface, said clamping means including a screw threaded bolt, a relatively large head on said bolt having a flat outer surface and a domed inner surface, said bolt extending through said supporting surface, with the domed inner surface engaging one side of said supporting surface, said base portion of the tine assembly being concave, said tine assembly being situated on the other side of said supporting surface, said bolt engaging through said base portion, and screw threaded clamp means engaging the upper end of said bolt and clamping said tine assembly to said supporting surface and urging said supporting surface into said concave base whereby the flat outer surface of the bolt head is substantially flush with said one side of said supporting surface, and the said rib embeds within said supporting surface.

2. The assembly according to claim 1 which includes means to prevent rotation of said bolt when engaging said screw threaded clamp means therethrough.

3. The assembly according to claim 2 in which said means to prevent rotation of said bolt includes a polygonal cross sectioned aperture formed through said base portion of said tine assembly, a corresponding polygonal cross section portion formed on the shank of said bolt, and engageable within said aperture.

4. The assembly according to claim 1 in which said tine includes a first portion extending from said base portion and a distal end portion extending at an angle from the outer end of said first portion, said tine assembly being formed from metal and being covered with a resilient material.

5. The assembly according to claim 2 in which said tine includes a first portion extending from said base portion and a distal end portion extending at an angle from the outer end of said first portion, said tine assembly being formed from metal and being covered with a resilient material.

6. The assembly according to claim 3 in which said tine includes a first portion extending from said base portion and a distal end portion extending at an angle from the outer end of said first portion, said tine assembly being formed from metal and being covered with a resilient material.

7. The assembly according to claims 1, 2 or 3 in which said tine includes a tapered cross sectional supporting rib formed longitudinally along the underside thereof and extending from adjacent said base to the distal end of said tine.

8. The assembly according to claims 4, 5 or 6 in which said tine includes a first portion extending from said base portion and a distal end portion extending at an angle from the outer end of said first portion, said tine assembly being formed from metal and being covered with a resilient material.

* * * * *